United States Patent
Anshits et al.

(10) Patent No.: US 6,667,261 B1
(45) Date of Patent: Dec. 23, 2003

(54) OPEN-CELL GLASS CRYSTALLINE POROUS MATERIAL

(75) Inventors: Alexander G. Anshits, Krasnoyarsk (RU); Olga M. Sharonova, Krasnoyarsk (RU); Tatiana A. Vereshchagina, Krasnoyarsk (RU); Irina D. Zykova, Krasnoyarsk (RU); Yurii A. Revenko, Krasnoyarsk Region (RU); Alexander A. Tretyakov, Krasnoyarsk Region (RU); Albert S. Aloy, Saint-Petersburg (RU); Rem I. Lubtsev, Saint-Petersburg (RU); Dieter A. Knecht, Idaho Falls, ID (US); Troy J. Tranter, Idaho Falls, ID (US); Yevgeny Macheret, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/144,984

(22) Filed: May 15, 2002

Related U.S. Application Data

(62) Division of application No. 09/721,962, filed on Nov. 27, 2000, now Pat. No. 6,444,162.

(51) Int. Cl.[7] .............................................. C04B 38/08
(52) U.S. Cl. ......................... 501/80; 501/155; 264/43; 264/628; 264/669; 264/125
(58) Field of Search ........................... 264/43, 44, 628, 264/669, 125; 501/80, 155

(56) References Cited

U.S. PATENT DOCUMENTS

| | | | |
|---|---|---|---|
| 2,948,948 A | * | 8/1960 | Duplin .......................... 264/43 |
| RE25,564 E | | 4/1964 | Alford et al. |
| 3,458,332 A | | 7/1969 | Alford et al. .................. 106/52 |
| 3,888,691 A | | 6/1975 | Villani et al. ............. 106/40 V |
| 4,016,229 A | | 4/1977 | Tobin ........................... 264/63 |
| 4,035,545 A | | 7/1977 | Ivanov et al. ................ 428/328 |
| 4,224,177 A | | 9/1980 | Macedo et al. ...... 252/301.1 W |
| 4,312,774 A | | 1/1982 | Macedo et al. .............. 252/629 |
| H200 H | | 1/1987 | Chen ........................... 428/404 |
| 5,227,047 A | | 7/1993 | Hwang ........................ 209/166 |

FOREIGN PATENT DOCUMENTS

GB  2 106 093 A  *  4/1983

OTHER PUBLICATIONS

Nardova, A. et al.,*Proceedings of Int. Topical Mtg. on Nuclear and Hazardous Waste Management, Spectrum '96*, Aug. 18–23, 1996, Seattle, WA (ANS 1996, pp. 2154–2160).

Nardova, A. et al.,*Proceedings of Int. Topical Mtg. on Nuclear and Hazardous Waste Management, Spectrum '96*, Aug. 18–23, 1996, Seattle, WA (ANS 1996, pp. 2120–2122).

Zaharov, M. et al., *Inorganic Materials*, vol. 29, #3, pp. 403–405 (1993).

Portnoi, K. et al.,*Soviet Atomic Energy*, 14, #6, pp. 582–585 (1964).

Nikiforov, A. et al., *Soviet Atomic Energy*, v. 70, #3, pp. 245–249 (1991).

Aloy, A, et al., "Development and Testing of a New Porous Crystalline Matrix (Gubka) for Stabilizing Actinide Solutions", abstract for paper QQ21.3 published Nov. 28, 1999 in Meeting Abstracts Book for Materials Research Society meeting, Nov. 29–Dec. 3, 1999,Boston, MA.

Anshits, A. et al., *Catalysis Today*, 42, pp. 197–203 (1998).
Fomenko, E. et al., *Catalysis Today*, 42, pp. 267–272 (1998).
Fomenko, E. et al., *Catalysis Today*, 42, pp. 273–277 (1998).

* cited by examiner

*Primary Examiner*—James Derrington
(74) *Attorney, Agent, or Firm*—Julia Cook Moody; Paul A. Gottlieb

(57) ABSTRACT

An open-cell glass crystalline porous material made from hollow microspheres which are cenospheres obtained from fly ash, having an open-cell porosity of up to 90 vol. % is produced. The cenospheres are separated into fractions based on one or more of grain size, density, magnetic or non-magnetic, and perforated or non-perforated. Selected fractions are molded and agglomerated by sintering with a binder at a temperature below the softening temperature, or without a binder at a temperature about, or above, the softening temperature but below the temperature of liquidity. The porous material produced has an apparent density of 0.3–0.6 g/cm$^3$, a compressive strength in the range of 1.2–3.5 MPa, and two types of openings: through-flow wall pores in the cenospheres of 0.1–30 micrometers, and interglobular voids between the cenospheres of 20–100 micrometers. The porous material of the invention has properties useful as porous matrices for immobilization of liquid radioactive waste, heat-resistant traps and filters, supports for catalysts, adsorbents and ion-exchangers.

10 Claims, No Drawings

OPEN-CELL GLASS CRYSTALLINE POROUS MATERIAL

This application is a divisional of U.S. patent application Ser. No. 09/721,962, filed on Nov. 27, 2000, now U.S. Pat. No. 6,444,162.

The United States Government has certain rights in this invention including rights pursuant to contract DE-AC07-99ID13727 awarded by the U.S. Department of Energy.

BACKGROUND OF THE INVENTION

The present invention relates to heat-resistant, acid-resistant, low-density open-cell porous materials, which are made from hollow microspheres, permeable for gas and liquids. Microspheres are cellulated glass hollow or solid microballoons, also known as spherical glass crystalline particles. Cenospheres are a particular class of hollow microspheres which are a component of fly ash obtained from the combustion of coal. The open-cell glass crystalline porous material of the invention is made from cenospheres, and has properties useful as porous matrices for immobilization of liquid radioactive waste, heat-resistant traps and filters, supports for catalysts, adsorbents and ion-exchangers.

Open-cell porous ceramic materials have been prepared in the prior art by means of foaming melts with the use of gas evolving additives, impregnation of ceramics on to a plastic network skeleton, and consolidation of different primary units (granules, fibers etc.). The meaning of "open-cell" porous materials used herein is porous materials with accessible internal voids composed of both voids between microspheres and voids inside the microspheres. Formed porous ceramic bodies differ considerably in their properties including texture (cellular or granular), open porosity, size of openings, and hydro- and aerodynamic resistance. For example, while the open porosity of cellular ceramics is up to 96 vol. %, the open porosity of granular materials is limited to about 40 vol. %. In spite of this, the porous structure of granular ceramics can be controlled more precisely by the shape and size of the primary units, especially in the case of microspherical particles. Other advantages of porous ceramics formed by microspheres are high compression strength and deformation ability.

The prior methods of forming porous ceramic bodies from microspheres were aimed predominantly at the creation of structural and insulating materials of small open or completely closed porosity, such as disclosed in U.S. Pat. Nos. 3,458,332, Re. 25,564, 4,016,229, 4,035,545 and U.S. Statutory Invention Registration (SIR) No. H200.

Heat-resistant porous structural materials of a 30–35% porosity comprising 50–75 vol. % of microspheres, 10–200 micrometers in diameter, of high-melting point oxides such as $ZrO_2$, $Al_2O_3$, $Y_2O_3$, are disclosed in U.S. Pat. No. 4,035,545. The microspheres are sintered directly to each other so that the diameter of their contact amounts to 0.2–0.5 of the microsphere diameter. Composition of the material can incorporate 20–50 vol. % of a filler as metal, metal alloy, intermetallic compound, phenol-formaldehyde resin, polyvinyl alcohol, glass etc. The process steps for making the heat-resistant porous structural material include the plasma processing of the powdered high-melting point oxides to form microspheres, molding and isothermal sintering in an oxygen-gas-fired furnace at 1850–2100° C. for 5–7 hours. The disadvantages of making such porous granular ceramic material are the high cost of initial components, high power consumption and complexity of the process.

U.S. Pat. No. 3,458,332 discloses the preparation of porous glass agglomerates of ⅛ to ½ inch (3,175–12,700 micrometers) in diameter by sintering a mass of hollow glass microspheres with diameters of 5–5,000 micrometers and an alkalinity in the range from 0.103 to 0.192 milliequivalent per gram. According to the method, agglomerates of glass microspheres are formed by fusing the microspheres to each other at their points of contact by subjecting them to a temperature of 900–1100° F. (482–593° C.). No information was given about the porosity.

Closed-cell porous insulating materials have been prepared from hollow glass or ceramic microspheres. "Closed-cell" is intended to mean that porous materials have internal voids with closed walls which are not permeable for gas and liquids Porous lightweight ceramic bodies are disclosed in U.S. Pat. No. 3,888,691. These porous bodies have a comparatively high strength per unit of weight, obtained by mixing hollow glass spheres with refractory components, including refractory particles (lithium-aluminum silicate) and a binder (calcium aluminate cement and/or colloidal silica). The mixture is formed into a solid body and heated at below the softening temperature of the refractory particles and above the melting temperature of the glass within the spheres, in order to cause the glass to be drawn into the composition. As a result, closed spherical pores are formed in the ceramic body.

The porous material disclosed in U.S. Pat. No. 4,016,229 is a closed-cell ceramic foam material which can be prepared by heating hollow glass crystalline microspheres, recovered from fly ash from coal combustion (cenospheres), in the presence of air at 1350–1650° C. for 0.25–1.5 hours. A coherent material having a bulk density of at least 0.50 $g/cm^3$ is formed. The cenospheres may be used directly after recovery from fly ash but it is preferred to pretreat them by a decrepitation and/or separation procedure. The cenospheres are decrepitated by heating at a temperature of from about 315–540° C. for 0.5–2 hours followed by separation in an organic liquid like heptane to obtain a fraction having a density of less than 0.35 $g/cm^3$. To form the cenospheres into a predetermined shape a temporary organic binder such as gum arabic, or polyvinyl alcohol is used. Prior to firing, the decrepitated cenospheres can be admixed with 0.1–30 wt. % of an additive selected from the group consisting of transition metal and rare earth compounds, preferably transition metal and rare earth carbonates. The closed-pore ceramic foam may be used as a non-combustible insulation panel or structural member for a vide variety of applications.

A method of producing a structural insulating composite is disclosed in the U.S. Statutory Invention Registration H200. The method comprises (1) selecting hollow closed-cell ceramic beads having an outer diameter in the range of about 20–200 micrometers, a wall thickness of above about 2.0 micrometers, a softening temperature above about 800° C. and a bulk density of about 0.3–0.5 $g/cm^3$, (2) forming a mixture of the ceramic beads with a compatible binder composition with the weight ratio of beads: binder of 1:1–2, (3) removing entrained gas bubbles in the mixture and compacting the mixture under sintering conditions and pressure to provide the structural insulating composition. The sintering conditions include a temperature of above about 700° C. but below the softening point of the microspheres. The final product obtained is characterized by a closely packed, bonded array of said beads with closed cells, useful as an insulating material at high temperatures.

Accordingly, an object of this invention is a method of producing an open-cell porous material, formed by cenospheres. Another object of the invention is a method of producing an open-cell glass crystalline porous material having open-cell porosity of up to 90 vol. %. A further object of the invention is a method of producing an open-cell glass crystalline porous material having a relatively low production cost. Another object of the invention is to produce an open-cell glass crystalline porous material having two types of openings, interglobular voids, i.e. voids between cenospheres, of 20–100 micrometers, and through-flow wall pores of 0.1–30 micrometers. An additional object of the invention is to produce an open-cell glass crystalline porous material having an open-cell porosity in the range of about 40 to about 90 vol. %, useful as a porous glass ceramic matrix for immobilization of liquid radioactive and other toxic waste, as a heat-resistant trap and filter, as a support for catalysts, an ion-exchanger and an adsorbent.

SUMMARY OF THE INVENTION

The material of high open-cell porosity which is characterized by two types of openings, interglobular voids and through-flow wall pores, is produced by separating cenospheres of fixed sizes and composition, molding the cenospheres and agglomerating the cenosphere array under sintering conditions. The separation steps include a required step of separation by density to remove the broken cenospheres and accessory particles such as unburned carbon, which are heavier than non-broken cenospheres. In addition the separation steps include one or more of the following steps, depending on the required parameters of the product: dry magnetic separation, separation by grain size, gravity concentration to group the cenospheres according to densities, and recovery of perforated and non-perforated cenospheres. To achieve the maximum open-cell porosity of 90%, the gravity concentration step (based on densities) is always performed. These steps, including the required step of removing broken cenospheres and other material can be performed in any order.

In one embodiment the cenospheres are separated into grain size groups, and into perforated and non-perforated cenospheres. The perforated cenospheres are selected and mixed with a wetting agent, such as water, and a binder, such as a liquid silicate glass, in a weight ratio of cenospheres:wetting agent:binder of about 1:(0.012–0.29):(0.15–0.30), followed by compaction of the obtained plastic mixture in a press form to reduce the mixture volume by 10–20%. The molded blocks are dried at 160° C. for 2 hours and sintered for 0.5–1 hour at a temperature above 800° C., e.g. at 850° C., but below the softening temperature of the cenospheres. The softening temperature depends on the cenosphere composition, which depends upon the location from which the fly ash was obtained. For the non-magnetic cenospheres from the Novosibirskaya power plant, the softening temperature is about 1100° C. Glasses are characterized by the softening temperature range. The low limit of this range is the softening temperature, and the high limit is the liquidity temperature, which is about 1400° C. for non-magnetic cenospheres from the Novosibirskaya power plant. The non-perforated cenospheres are placed in a refractory mold of a predetermined shape, the mold is placed in a muffle and held at sintering temperature above 1000° C. but below the liquidity temperature for 20–60 minutes. After sintering, the cenosphere agglomerate is additionally treated with acid reagents selected from the group consisting of 3–6 M hydrochloric acid, $NH_4F$—HF—$H_2O$ with content of $F^-$ about 15–30 gram-ions per liter at a molar ratio $NH_4F/HF$ of about 0.1–1.0; and $NH_4F$—HCl—$H_2O$ with content of $F^-$ about 1–10 gram-ions per liter at a molar ratio $F^-/Cl^-$ of about 0.1–1.0. The cenospheres have a diameter in the range of 40–800 micrometers, preferably in the range of 50–400 micrometer, a softening temperature above about 1000° C., a temperature of liquidity about 1400° C., and bulk density above about 0.25 $g/cm^3$. The resulting porous material is characterized by open-cell porosity in the range of about 40 to about 90 vol. %, interglobular openings in the range of 20–100 micrometers, through-flow wall pore size of 0.1–30 micrometers, an apparent density in the range of 0.3–0.6 $g/cm^3$ and a compressive strength in the range of 1.2–3.5 MPa.

DETAILED DESCRIPTION OF THE INVENTION

Cenospheres obtained from fly ash are a relatively cheap material of high quality obtained as a by-product in coal combustion at power plants. Cenospheres are characterized by spherical design, chemical and thermal stability, and high hydrostatic compressive strength of about 20–30 MPa at 50% destruction, and 10 MPa at 12% destruction. The composition of their shells includes predominantly Si and Al and a minor content of Fe, Mg, Ca, Na, K, and Ti. The chemical composition of cenospheres obtained from combustion of Kuznetskii coals (Russia) is presented in Table 1.

TABLE 1

Chemical Composition of Cenospheres from Kuznetskii Coals

| Power plant | Content of Oxide, wt. % | | | | | | | |
| --- | --- | --- | --- | --- | --- | --- | --- | --- |
| | $SiO_2$ | $Al_2O_3$ | $Fe_2O_3$ | CaO | MgO | $Na_3O$ | $K_2O$ | $TiO_2$ |
| Tom-Usinskaya | 65.2 | 24.6 | 4.5 | 2.1 | 1.5 | n.d.* | n.d. | n.d. |
| Novosibirskaya | 65.0 | 20.8 | 4.2 | 2.4 | 2.1 | 0.5 | 2.3 | 0.6 |

TABLE 1-continued

Chemical Composition of Cenospheres from Kuznetskii Coals

| Power plant | Content of Oxide, wt. % | | | | | | | |
|---|---|---|---|---|---|---|---|---|
| | $SiO_2$ | $Al_2O_3$ | $Fe_2O_3$ | CaO | MgO | $Na_3O$ | $K_2O$ | $TiO_2$ |
| Belovskaya | 64.0 | 20.7 | 5.1 | 2.6 | 1.7 | 1.2 | 3.0 | 1.4 |
| Moskovskaya | 63.1 | 26.4 | 4.3 | 0.9 | 1.0 | 0.7 | 3.3 | 0.6 |
| Vladimirskaya | 64.7 | 20.0 | 5.1 | 1.6 | 2.6 | 1.1 | 4.0 | 0.8 |

*n.d. not determined

Cenospheres are chemically inert and are exempt from classification as a hazardous waste as determined by the United States Environmental Protection Agency. They are considered reclaimable under the Resource Conservation and Recovery Act (42 U.S.C. §§6901–6992-15) and their reuse is labeled as environmentally sound.

Cenospheres are usually recovered from fly ash by flotation in water as a mixed material involving globules of different size, density, morphology and composition. To provide an open-cell porous material with predetermined parameters (open-cell porosity, compressive strength, apparent density, size of openings, composition), the cenospheres of fixed properties can be selected by one or more of the following steps, in any order: dry magnetic separation, grain size separation, density separation, for instance by gravity concentration by placing the cenospheres in organic liquids having a density less than water, and separation into perforated and non-perforated. Using the first three methods for separation of cenospheres from the Novosibirskaya power plant gives 24 products of different magnetizability (magnetic and non-magnetic products in a ratio about 1:20 by weight), sizes (−400+200, meaning less than the sieve hole size of 400 but greater than the sieve hole size of 200 micrometers, −200+160, −160+100, and −100+63 micrometers, for both magnetic and non-magnetic products), and bulk density (0.32, 0.43, 0.49 g/cm³ and 0.36, 0.45, 0.52 g/cm³ for non-magnetic and magnetic products, accordingly).

The chemical composition of the cenospheres is as follows. Data of chemical analysis indicate that the concentration of iron in magnetic products is 2–3 times greater than in non-magnetic products. The Mg and Ca content of magnetic cenospheres is also higher. On the contrary, the content of $SiO_2$ and $Al_2O_3$ is lower than in non-magnetic products. As for other elements, the content of $Na_2O$, $K_2O$ and $TiO_2$ does not differ appreciably in magnetic and non-magnetic products. The following ranges of composition for magnetic and non-magnetic products accordingly are respectively as follows: $SiO_2$—58.0–61.0 wt. % and 64.9–66.3 wt. %, $Al_2O_3$—18.2–20.4 wt. % and 20.1–21.1 wt. %; $Fe_2O_3$—9.7–12.3 wt. % and 3.1–4.6 wt. %; MgO—1.4–3.0 wt. % and 1.9–2.2 wt. %, CaO—2.3–3.8 wt. % and 1.8–2.7 wt. %; $Na_2O$—0.4–1.3 wt. % and 0.3–0.6 wt. %; $K_2O$—1.8–2.7 wt % and 1.9–2.9 wt. %, $TiO_2$—0.3–0.8 wt. % and 0.2–0.5 wt. %.

To provide an open-cell porosity of material based on using cenospheres, a cenosphere agglomerate is produced so that the hollow globules are sintered to each other at their points of contact either with or without a binder. To enhance an interglobular void of the sintered cenosphere array and to obtain openings of a predicted size, the cenospheres having diameters in a narrow range of values are preferable. The lightest fraction with an accessible interglobular void produced total open-cell porosity up to 90 vol. %, which is as high as porosity of the cellular porous bodies. It is also desirable to have through-flow pores in the cenosphere walls, which make the internal void of cenospheres accessible.

Perforated cenospheres which can be recovered by vacuum injection with water have been found in all fractions of cenospheres. Their total content in the cenospheres of Novosibirskaya power plant is 10–13 wt. %. The evidence from a scanning electron microscope (SEM) shows there are some cracks of 2–5 micrometers in width and through-flow pore holes of 10–30 micrometers in diameter on the cenosphere surface. Non-perforated cenospheres can be easily perforated with appropriate acid reagents, due to the irregular chemical and phase composition of the glass crystalline shell. The defects of the structure allow the cenospheres to be etched in local sites. The chemical composition of magnetic cenospheres of Kuznetskii coals (using size 160–100 micrometers) was measured, by non-destructive electron probe microanalysis, at different points on a single cenosphere shell, and the following ranges were found (in wt. %): $SiO_2$—60–70, $TiO_2$—0.6–2.0; $Al_2O_3$—18–22; FeO—2–6; CaO<1; MgO—1–2; $K_2O$—3–4.5; $Na_2O$—0.3–0.5. The heterogeneities in glass composition were found to arise from fine inclusions of ore minerals corresponding to quartz, hematite, magnetite and mullite. Treatment of non-perforated cenospheres with hydrochloric acid is accompanied by leaching of soluble components of glass (Fe, K, Na) forming through-flow pores with openings of 0.1–0.3 micrometers corresponding to dimensions of leached crystallites. A more regular distribution of through-flow holes in the cenosphere shell was obtained by using mild reagents based on hydrogen fluoride. In this case the silica of the glass phase is subjected to the action of reagent. By etching of the cenospheres with $NH_4F$—HF—$H_2O$ or $NH_4F$—HCl—$H_2O$, it became possible to obtain circular holes of 2–20 micrometers in diameter. Thus, variation of acid reagent produced through-flow holes in the cenosphere shell with openings in the range of 0.1–20 micrometers. Naturally perforated cenospheres recovered from initial material provides through-flow openings up to 30 micrometers.

In a preferred embodiment, the perforated cenospheres are agglomerated by mixing with water as the wetting agent, and a liquid silicate glass binder, in a weight ratio of cenospheres:wetting agent:binder of about 1:(0.012–0.29):(0.15–0.30) followed by compaction of the mixture, drying at 160° C. for 2 hours and sintering at a temperature above 800° C. but below the softening temperature, which in this example is 1100° C., for 0.5–1 hour. The porous body obtained in such a manner has an open-cell porosity of from 55 to 75 vol. %. Compaction of the non-perforated cenospheres with the silicate binder under the same conditions produced a porous material of 40–50 vol. % open-cell porosity. This material is characterized by high stability to acids, excluding acid reagents based on hydrogen fluoride.

Non-perforated cenospheres can be agglomerated without any binder under sintering conditions which promote the perforation of the cenospheres. The resulting porous body has an enhanced open-cell porosity and is more stable to acids than material sintered with the binder. On heating of an array of non-perforated cenospheres, the glass walls start melting at a temperature of about 1000–1100° C., and the softened walls stick to each other. It is believed that crystallization of the melt on cooling causes wall cracking and perforation because of the different coefficients of thermal expansion for crystalline and amorphous phases. The factors controlling an apparent density and open-cell porosity of the resulting porous material are temperature and time of sintering. For example, an open-cell porous material having the open-cell porosity of about 55–60 vol. % can be obtained from cenospheres of the Novosibirskaya power plant by sintering at 1100° C. for 20–60 minutes. The further treatment of the sintered porous body with acid reagents provides an open-cell porosity of about 70–75 vol. % (using hydrochloric acid) and 85–90 vol. % (using $NH_4F$—$HF$—$H_2O$ or $NH_4F$—$HCl$—$H_2O$).

DESCRIPTION OF THE PREFERRED EMBODIMENTS

Some compositions and methods within the scope of the invention are illustrated by the following non-limiting examples.

EXAMPLE I (a)

About 1.5 kg of a light-weight fraction of fly ash from Novosibirskaya power plant is separated into magnetic and non-magnetic products by applying a magnetic field. After that, both products are classified by their grain sizes selecting dominant fractions of −400+200; −200+160; −160+100; and −100+63 micrometers (8 products). Every fraction obtained by grain size classification is subsequently placed into a glass beaker filled with water where the cenosphere material separates into a floating layer and a sinking layer, the sinking layer containing heavier particles such as broken cenospheres and accessory particle, and which should be removed. The floating cenospheres are collected and drained in a Buechner funnel. The drained cenospheres are dried at 110–150° C., and then they are placed in ethanol where they are separated into a light (floating) layer and a heavy (sinking) layer. Both the light and the heavy layers are collected separately, drained and dried under similar conditions. The cenospheres which were floating in ethanol are placed in n-hexane where they separate again into two layers. Both layers are drained and allowed to air dry in a vented hood. In this way every fraction is divided into 3 products of different bulk densities (0.32, 0.43, 0.49 $g/cm^3$ and 0.36, 0.45, 0.52 $g/cm^3$ for non-magnetic and magnetic products, accordingly). Altogether there are 24 products recovered by this procedure. Their yields calculated for the initial mixed material are presented in Table 2.

TABLE 2

Yields of products of different size and bulk density in three-step separation of cenospheres from Novosibirskaya power plant (wt. %)

| Size, | Magnetic | | | Non-magnetic | | |
|---|---|---|---|---|---|---|
| micrometers | 0.36 $g/cm^3$ | 0.45 $g/cm^3$ | 0.52 $g/cm^3$ | 0.32 $g/cm^3$ | 0.43 $g/cm^3$ | 0.49 $g/cm^3$ |
| −400 + 200 | 0.4 | 0.5 | 0.5 | 7.7 | 9.1 | 5.7 |
| −200 + 160 | 0.3 | 0.5 | 0.4 | 5.8 | 7.2 | 5.2 |
| −160 + 100 | 0.3 | 0.9 | 0.6 | 11.9 | 16.4 | 8.0 |
| −100 + 63 | 0.1 | 0.1 | <0.1 | 5.4 | 4.7 | 1.7 |

Every fraction is then packed in a textile bag and subsequently placed into a glass vessel which is pumped down by a water jet pump up to 8.0 kPa and kept at the reduced pressure for 20–30 minutes. Then the vessels containing the cenospheres are filled with water by suction and left for 20–30 minutes until degassing is completed. The cenospheres are held under the water layer by a metallic net. After this procedure, the pressure in the vessels is returned to atmospheric pressure resulting in the injection of water into the cavities of perforated cenospheres. The wet cenospheres are removed from the textile bag and placed in a glass beaker with water so that the cenospheres are separated into a floating layer (non-perforated product) and a sinking layer (perforated product). The layers are drained in a Buechner funnel and dried at 110–150° C. The content of the perforated products in different fractions of cenospheres is shown in Table 3.

TABLE 3

The content of perforated products in different fractions of cenospheres of Novosibirskaya power plant (wt. %)

| Size, | Magnetic | | | Non-magnetic | | |
|---|---|---|---|---|---|---|
| micrometers | 0.36 g/cm³ | 0.45 g/cm³ | 0.52 g/cm³ | 0.32 g/cm³ | 0.43 g/cm³ | 0.49 g/cm³ |
| −400 + 200 | 18 | 7 | 33 | 28 | 20 | 15 |
| −200 + 160 | 18 | 15 | 29 | 17 | 14 | 11 |
| −160 + 100 | 33 | 16 | 50 | 11 | 14 | 16 |
| −100 + 63 | 5 | 13 | 37 | 6 | 6 | 22 |

EXAMPLE I (b)

In this example, perforated non-magnetic cenospheres of size −160+100 micrometers, and bulk density 0.32 g/cm³, are selected for preparation of an open-cell glass crystalline material. 15 g of the cenospheres are mixed with 2.7 g of a liquid silicate glass and 3 ml of water. The plastic mixture is compacted by one-side pressing in a cylinder mold of 35 mm in diameter to reduce the volume of the mixture by 10–20%. The formed block is removed from the mold and dried in an oven at 160° C. for 1 hour. After drying, the block is placed in a muffle on a ceramic support and sintered by heating in an air atmosphere from room temperature to 850° C. at about 10° C./min and holding at 850° C. for 0.5 hour. Thereafter, the furnace is switched off and allowed to cool prior to removing the open-cell glass crystalline material.

As revealed by enlarged photographs of the porous block, the cenospheres are bonded to each other at their points of contact to form arrays with interglobular openings of 30–50 micrometers. SEM images show that the openings in the cenosphere shells are cracks of 2–5 micrometers in width and through-flow holes of 10–30 micrometers in diameter. The open-cell porosity of the porous block ($P_{open}$, vol. %) is calculated based on its water loading at boiling for 1 hour. The total porosity ($P_{total}$, vol. %) is evaluated based on the true density of compact glass crystalline material of cenospheres ($D_{true}$=2.5 g/cm³) and apparent bulk density of the porous body ($D_{apparent}$, g/cm³) according to equation $P_{total}=(1-D_{apparent}/D_{true})*100\%$. The parameters of the porous block are as follows:

| | |
|---|---|
| $D_{apparent}$, g/cm³ | 0.36 |
| $P_{total}$, vol. % | 86 |
| $P_{open}$, vol. % | 75 |
| compressive strength, MPa | 2.7 |
| interglobular openings, micrometers | 30–50 |
| through-flow pore openings, micrometers | 2–5 |

EXAMPLES II–IV

In these examples, three groups of non-perforated non-magnetic cenospheres of size −160+100 micrometers, having a bulk density of 0.32 g/cm³ (sample II), 0.43 g/cm³ (sample III) and 0.49 g/cm³ (sample IV), recovered as described in the steps in Example I (a), are selected for preparation of the open-cell glass crystalline material. About 2 g of cenospheres from each of the three weight groups are put into alumina cylinder molds of 2 cm in diameter and 2 cm in height. The molds are then placed in a muffle on a ceramic support and sintered by heating from room temperature to 1100° C. at about 10° C./min and holding at 1100° C. for 0.5 hour. This causes the cenospheres to become perforated. Thereafter, the furnace is switched off and allowed to cool prior to removing the blocks of the open-cell glass crystalline material. The parameters of the porous blocks are as follows:

| | II | III | IV |
|---|---|---|---|
| $D_{apparent}$, g/cm³ | 0.36 | 0.50 | 0.56 |
| $P_{total}$, vol. % | 86 | 80 | 78 |
| $P_{open}$, vol. % | 68 | 64 | 66 |
| compressive strength, MPa | 1.5 | 2.5 | 3.5 |
| interglobular openings, micrometers | 30–50 | 20–40 | 30–40 |
| through-flow pore openings, micrometers | 2–5 | 2–5 | 2–5 |

EXAMPLES V–VII

Cylinder blocks of the open-cell glass crystalline material based on the non-perforated non-magnetic cenospheres of size 160–100 micrometers, the cenospheres having a bulk density of 0.32 g/cm³ (sample V), 0.43 g/cm³ (sample VI) and 0.49 g/cm³ (sample VII) are produced as in Examples II–IV. Following the sintering at 1100° C. and cooling step, the blocks are treated with 6 M hydrochloric acid for 1 hour with boiling. Then the blocks are repeatedly washed with distilled water, vacuum suction is applied, and they are dried at 110° C.

The parameters of the porous blocks are as follows:

| | V | VI | VII |
|---|---|---|---|
| $D_{apparent}$, g/cm³ | 0.36 | 0.49 | 0.52 |
| $P_{total}$, vol. % | 86 | 80 | 79 |
| $P_{open}$, vol. % | 72 | 70 | 69 |
| compressive strength, MPa | 1.3 | 2.4 | 3.2 |
| interglobular openings, micrometers | 30–50 | 20–40 | 30–40 |
| through-flow pore openings, micrometers | 0.1–5 | 0.1–5 | 0.1–5 |

EXAMPLES VIII–X 10 grams of non-magnetic non-perforated cenospheres of 160–100 micrometers having a bulk density of 0.32 g/cm³ are recovered from the floating layer as described in the steps of Example I(a). These cenospheres are additionally separated by density by a downward water flow in a column of water, yielding 4 grams of cenospheres having a bulk density of 0.29 g/cm³.

This 4 gram fraction having a bulk density of 0.29 g/cm³ (sample VIII) and other non-magnetic non-perforated fractions having a bulk density of 0.43 g/cm³ (sample IX) and 0.49 g/cm³ (sample X) are then processed according to the steps in Examples II–IV, yielding cylinder blocks of the open-cell glass crystalline material having an apparent bulk density of 0.31 g/cm³ (sample VIII), 0.49 g/cm³ (sample IX) and 0.54 g/cm³ (sample X). After sintering at 1100° C., as described in examples II–IV, the blocks are treated with $NH_4F$—$HF$—$H_2O$ having a content of F about 17 gram-ions per liter, at a molar ratio $NH_4F/HF$ of about 1.0, for 15 minutes at room temperature. Then the blocks are sequentially washed with 0.1 M hydrochloric acid and distilled water under vacuum suction, followed by drying at 110° C.

The parameters of the porous blocks are as follows:

|  | VIII | IX | X |
|---|---|---|---|
| $D_{apparent}$, g/cm³ | 0.26 | 0.44 | 0.50 |
| $P_{total}$, vol. % | 90 | 82 | 80 |
| $P_{open}$, vol. % | 88 | 80 | 77 |
| compressive strength, MPA | 1.2 | 2.0 | 2.6 |
| interglobular openings, micrometers | 30–50 | 20–40 | 30–60 |
| through-flow pore openings, micrometers | 10–30 | 10–30 | 10–30 |

As indicated above by all examples, the glass crystalline porous material is characterized by an open-cell porosity up to almost 90 vol. %, two types of openings, interglobular openings in the range of 20–60 micrometers (the upper limit of 100 micrometers for interglobular openings can be achieved when using cenospheres of large sizes, in particular of −400+200 micrometers or more), and through-flow pore openings in a cenosphere wall in the range of 0.1 up to 30 micrometers, an apparent density in the range of 0.3–0.6 g/cm³ and a compressive strength in the range of 1.2–3.5 MPa . This material also exhibited high gas permeability.

One of the important advantages of the invention is the good stability in strong acid media, excluding HF based acids, of the cenosphere blocks made with a binder, which makes it an ideal material for use as a filter, trap, ion-exchanger and the like in acid media. Experiments were performed to determine the mass loss of the block in a high acid matrix. This was accomplished by suspending the blocks in solutions of 3 M, 6 M, 9 M, and 12 M $HNO_3$ for 3 hours with constant stirring. The tests were performed at temperatures of 20, 40, and 60° C.

The data from the experiments showed that the acid stability of the microsphere blocks is nearly linear in character from 0 to 3 hours contact time and does not show a significant dependency on $HNO_3$ concentration over the range of 3 M to 12 M. . In all cases studied, the total mass loss of the blocks did not exceed 1%.

In addition to the examples given, the open-cell glass crystalline material of the invention can be made using only non-magnetic non-perforated cenospheres, magnetic non-perforated cenospheres, magnetic perforated cenospheres, a mixture of magnetic perforated with magnetic non-perforated cenospheres, and any mixtures of non-magnetic, magnetic, perforated and non-perforated cenospheres. In cenospheres obtained from the fly ash of Kuznetskii coal, the natural content of magnetic cenospheres (both perforated and non-perforated) is about 5%. However, it is possible for purposes of this invention to mix different ratios of magnetic (perforated or non-perforated) cenospheres with non-magnetic (perforated or non-perforated) cenospheres. Other modifications and variations of the above present invention are possible in the light of the above teaching. The changes may be made in the particular embodiments of the invention as defined by the appended claims.

We claim:

1. A toxic waste imobilizing, open-cell glass crystalline porous sintered material comprising hollow microspheres, said microspheres comprising cenospheres obtained from fly ash, said porous material containing two types of openings comprising through-flow wall pores in said cenospheres and interglobular voids between said cenospheres, said porous material having an open-cell porosity of between about 55–90 vol. %.

2. The open-cell glass crystalline porous material of claim 1 wherein said cenospheres have diameters in the range of 40–800 micrometers.

3. The open-cell glass crystalline porous material of claim 2 wherein said interglobular voids have sizes within the range of about 20–100 micrometers and said through-flow wall pores have sizes within the range of about 0.1–30 micrometers.

4. The open-cell glass crystalline porous material of claim 3 wherein said cenospheres have a bulk density above about 0.25 g/cm³.

5. The open-cell glass crystalline porous material of claim 4 whose apparent bulk density is in the range of 0.3–0.6 g/cm³ and whose compressive strength is in the range of 1,2–3.5 MPa.

6. The open-cell glass crystalline porous material of claim 5 wherein said cenospheres have a temperature of liquidity of about 1400° C.

7. The open-cell glass crystalline porous material of claim 6 wherein said cenospheres have a softening temperature above about 1000° C.

8. The open-cell glass crystalline porous material of claim 7 wherein said cenospheres have diameters in the range of 50–400 micrometers.

9. The open-cell glass crystalline porous material of claim 7 wherein said cenospheres have diameters in the range of 100–160 micrometers, said interglobular voids are 20–60 micrometers, and through-flow pore openings are 10–30 micrometers, and said open-cell porosity is about 90 vol. %.

10. An open-cell glass crystalline porous material containing cenospheres, having an open cell porosity of 55–90 vol. % produced by a method comprising (a) separating said cenospheres by one or more of the following steps, in any order: separating by size, by density, by magnetic or non-magnetic property, and separating perforated from non-perforated cenospheres, (b) removing broken cenospheres and accessory particles, (c) molding a selected fraction of said separated cenospheres, and (d) agglomerating said cenospheres under sintering conditions, said sintering conditions including isothermal holding of said cenospheres in an air atmosphere at a temperature above 800° C. but below the temperature of liquidity of said cenospheres.

* * * * *